US012658598B2

(12) United States Patent
Göttl

(10) Patent No.: US 12,658,598 B2
(45) Date of Patent: Jun. 16, 2026

(54) MULTI-BAND ANTENNA AND MOBILE COMMUNICATION BASE STATION

(71) Applicant: Telefonaktiebolaget LM Ericsson (publ), Stockholm (SE)

(72) Inventor: Maximilian Göttl, Frasdorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 18/282,033

(22) PCT Filed: Mar. 25, 2021

(86) PCT No.: PCT/EP2021/057802
§ 371 (c)(1),
(2) Date: Sep. 14, 2023

(87) PCT Pub. No.: WO2022/199821
PCT Pub. Date: Sep. 29, 2022

(65) Prior Publication Data
US 2024/0305013 A1 Sep. 12, 2024

(51) Int. Cl.
*H01Q 21/06* (2006.01)
*H01Q 1/24* (2006.01)
*H01Q 5/42* (2015.01)

(52) U.S. Cl.
CPC ........... *H01Q 21/062* (2013.01); *H01Q 1/246* (2013.01); *H01Q 5/42* (2015.01)

(58) Field of Classification Search
CPC ........ H01Q 21/062; H01Q 1/246; H01Q 5/42; H01Q 21/26
See application file for complete search history.

(56) References Cited

U.S. PATENT DOCUMENTS 5,557,291 A * 9/1996 Chu ..................... H01Q 13/085 343/768
6,795,020 B2 * 9/2004 Sreenivas ................ H01Q 1/38 343/893
6,937,191 B2 8/2005 Puente Baliarda
9,698,486 B2 7/2017 Shooshtari et al.
10,148,012 B2 12/2018 Wu et al.
(Continued)

FOREIGN PATENT DOCUMENTS

CN 110858679 A 3/2020
EP 1935057 B1 2/2012
WO 2020191605 A1 10/2020

OTHER PUBLICATIONS

International Search Report and Written Opinion for International Patent Application No. PCT/EP2021/057802, mailed Dec. 20, 2021, 10 pages.

*Primary Examiner* — Renan Luque
(74) *Attorney, Agent, or Firm* — Withrow & Terranova, PLLC

(57) ABSTRACT

A multi-band antenna, in particular for a mobile communication base station, comprises a first array of first radiators for a first frequency band and a second array of second radiators for a second frequency band. The first array and the second array are interleaved such that in the region of overlap of the first array and the second array the rows (R1) of the first array and the rows (R2) of the second array are arranged alternatingly in a vertical direction (V) of the antenna. Further, a mobile communication base station is shown.

19 Claims, 4 Drawing Sheets

(56) References Cited

U.S. PATENT DOCUMENTS

| | | | | |
|---|---|---|---|---|
| 2016/0172757 | A1 | 6/2016 | Gottl | |
| 2018/0159203 | A1 | 6/2018 | Baks et al. | |
| 2021/0044020 | A1* | 2/2021 | Liu | H01Q 21/062 |

* cited by examiner

MULTI-BAND ANTENNA AND MOBILE COMMUNICATION BASE STATION

This application is a 35 U.S.C. § 371 national phase filing of International Application No. PCT/EP2021/057802, filed Mar. 25, 2021, the disclosure of which is incorporated herein by reference in its entirety.

TECHNICAL FIELD

The invention relates to a multi-band antenna as well as a mobile communication base station having a multi-band antenna.

BACKGROUND

Mobile telecommunication requires in the future massive multiple input multiple output (MIMO) antennas that operate over a wide frequency range. At the same time, the antenna should be based on large arrays of radiators to allow for beamforming.

WO 2020/191605 A1 shows a dual band antenna having two distinct array for different frequency bands. The arrays have two columns each as well as six and eleven rows, respectively. The arrays are interleaved with one another, wherein the vertical distance and horizontal distance of each of the arrays is only chosen with respect to the wavelength of the respective frequency band of the array.

U.S. Pat. No. 10,148,012 B2 also comprises a multi-band antenna with radiators for different frequency bands. For the lowest frequency band, only one column is provided.

For massive MIMO applications, however, arrays with more than two columns are necessary so that the solutions of the prior art cannot be applied.

SUMMARY

It is therefore the object of the invention to provide a multi-band antenna and a mobile communication base station for MIMO purposes that allow the generation of large areas of radiators.

For this purpose, a multi-band antenna, in particular for a mobile communication base station is provided. The multi-band antenna comprises a first array of first radiators for a first frequency band and a second array of second radiators for a second frequency band. The first array comprises at least four rows and at least four columns of the first radiators, and the second array comprises at least four rows and at least four columns of the second radiators. The first array and the second array are interleaved such that in the region of overlap of the first array and the second array the rows of the first array and the rows of the second array are arranged alternatingly in a vertical direction of the antenna.

By departing from the idea that the distance of the radiators, at least in the vertical direction, has to be around 0.9 times the wavelength of the highest frequency in the frequency band, which is applied throughout the prior art, it is possible that the rows of the first and second arrays can be arranged alternatingly in the vertical direction. With that, the position and thus the support points of the first and second radiators can be spaced further apart even over very large arrays so that the manufacture and wiring of the antenna can be simplified drastically.

In particular, the location of a radiator is defined by its support point.

The arrays are, for example, interleaved in a top view onto the antenna.

The first and second radiators may have the same reflector plane, but may have different heights with respect to the reflector plane.

For example, the first frequency band lies below the second frequency band and/or the first frequency band and the second frequency band do not overlap.

Further, the antenna is designed and suitable for massive MIMO applications.

Within this disclosure, the vertical direction and horizontal direction refer to the vertical direction and horizontal direction, respectively, in the intended and correctly mounted position of the antenna.

It is of course possible that the antenna has more than two arrays for more than two frequency bands. In this case a third, fourth, etc. array is provided having the same relation to the first array as the second array.

In an aspect of the invention, along a vertical line in the region of overlap, the first radiators and the second radiators are arranged alternatingly, and/or the center of the first array is offset from the center of the second array. This way, the radiators can be placed with no or little overlap of their active areas.

It is of course possible that vertical lines exist in which first radiators are present but no second radiators and vice versa.

In an embodiment, in the vertical direction, the first radiators are spaced apart by a first vertical distance and the second radiators are spaced apart by a second vertical distance, wherein the second vertical distance lies in a range of −10% to +10% around the first vertical distance, in particular the second vertical distance is the same as the first vertical distance. This way, the rows of the two arrays can be interleaved with one another even for very large arras with more than 16 or 32 rows.

In order to achieve an equal spacing between the rows, the first vertical distance lies in the range of 0.2 to 0.7, in particular 0.3 to 0.6 of the wavelength of the highest frequency in the first frequency band and/or that the second vertical distance lies in the range of 0.5 to 1.1, in particular 0.6 to 1.0 of the wavelength of the highest frequency in the second frequency band.

In an aspect of the invention, in the horizontal direction, the first radiators are spaced apart by a first horizontal distance and the second radiators are spaced apart by a second horizontal distance, wherein the first horizontal distance lies in the range of 0.4 to 0.6, in particular is equal to 0.5 of the wavelength of the highest frequency in the first frequency band and/or that the second horizontal distance lies in the range of 0.4 to 0.6, in particular is equal to 0.5 of the wavelength of the highest frequency in the second frequency band. This way, optimal radiation characteristics are achieved.

The first array and/or the second array comprises least 4, 8, 16 or 32 columns and/or rows of radiators to provide the number of radiators necessary for massive MIMO applications.

In order to further improve the transmission rate of the antenna, the first radiators and/or the second radiators are dual polarized radiators with two orthogonal polarizations, in particular the two polarizations being the horizontal and the vertical linear polarization; the +45° and the −45° linear polarization; the clockwise and the counterclockwise circular polarization; or any other two orthogonal polarizations.

For example, the polarizations of the first radiators are the same or different from the polarizations of the second radiators, either reducing complexity of the antenna or limiting interferences between the two frequency bands or improving S-parameters like isolation.

In an embodiment, the antenna is an active antenna, in particular the antenna comprises a filter, a phase shifter, a splitter and/or a combiner for the signals received and/or emitted from the radiators. Additionally, the antenna may comprise a PA (power amplifier) and/or a LNA (low noise amplifier). This way, a compact design can be achieved.

For example, the antenna comprises a first filter, a first phase shifter, a first splitter and/or a first combiner connected to one or more of the first radiators and a second filter, a second phase shifter, a second splitter and/or a second combiner connected to one or more of the second radiators. Thus, the signal processing of the signals of the two frequency bands is independent from each other so that the signal quality is improved. PAs and LNAs can also be added to the independent frequency bands.

In particular, first and second filters, phase shifters, splitters and/or combiners are separate from one another. The connection between the components or to the radiators may be galvanically and/or capacitively.

In an embodiment, the antenna comprises a plurality of modules, wherein each module comprises first radiators of parts of the first array and/or second radiators of parts of the second array, wherein the modules are arranged adjacent to each other such that the first radiators and/or the second radiators of the modules together form the full first array and/or the full second array, respectively. With the use of modules, antennas for various length and in various sizes can be manufactured cost-efficiently.

For example, each module comprises a filter, a phase shifter, a splitter and/or a combiner for the signals received and/or emitted from the first radiators and/or second radiators of the respective module. Thus, the modules also comprise the active parts of the antenna so that the combination of modules is simplified further.

In particular, the first radiators and/or the second radiators are manufactured on a circuit board.

In an aspect of the invention, the first frequency band and the second frequency band are frequencies bands in the range of 0.6 to 24 GHZ, in particular the first frequency band has a frequency range of 1.4 to 3 GHz and the second frequency band has a frequency range of 3.1 to 6 GHz; or the first frequency band has a frequency range of 6.425 to 10.68 GHz and the second frequency band has a frequency range of 10.7 to 15.35 GHZ; or the first frequency band has a frequency range of 3 to 5 GHz and the second frequency band has a frequency range of 5.9 to 10.7 GHZ; or the first frequency band has a frequency range of 600 to 960 MHz and the second frequency band has a frequency range of 1400 to 2700 MHZ.

In order to reduce losses or to allow flexible placing of the radiators, the first radiators and the second radiators may have an active area in the vertical and horizontal direction each, wherein the active areas of first radiators overlap or do not overlap with active areas of second radiators.

In particular, the first radiators are transparent for electromagnetic radiation in the second frequency band.

Within this disclosure, the active area of a radiator is, for example, the area of the smallest rectangle in the vertical and horizontal direction enclosing the respective radiator.

In a further embodiment of the invention, the number of rows of the first array is double of the number of rows of the second radiators of the second array, that the number of rows of the first array is double the number of columns of the first array and/or that the first array has a length in the vertical direction corresponding to at least the length of an array of the same frequency band with half the number of rows but a vertical distance between neighboring radiators between 0.8 and 1.0, in particular of 0.9 of the wavelength of the highest frequency of the frequency band. This way, the antenna gain in the first frequency band is improved. If the radiators are applied to circuit boards directly, e.g. printed, the costs for the additional radiators is negligible.

In order to improve the radiation characteristics, the second array may comprise dummy radiators surrounding the outer rows and columns of second radiators.

The dummy radiators may be similar or identical to the second radiators. The ports of the dummy radiators are short-circuited or terminated with a resistance, for example 50 Ohms.

For example, the dummy radiators are arranged in two rows and two columns forming a rectangle around the area of second radiators, in particular wherein the dummy radiators are spaced apart from the second radiators with the same or a shorter distance than the respective distance between two neighboring second radiators. This way the dummy radiators can be arranged without increasing the size of the antenna.

For above purpose, a mobile communication base station is further provided. The mobile communication base station comprises at least one antenna as described above.

The features and advantages explained with respect to the antenna also apply to the mobile communication base station and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
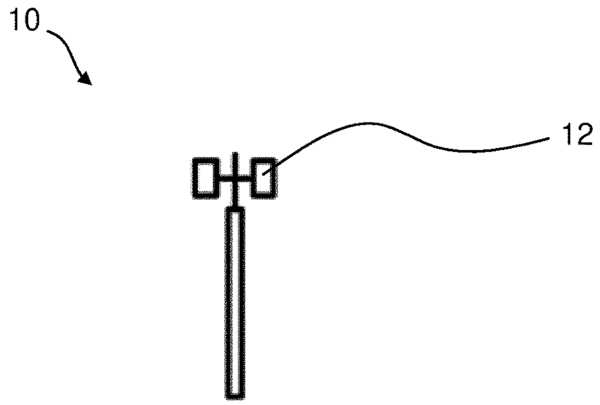
FIG. 1: shows very schematically a mobile communication base station according to the invention having a multiband antenna according to the invention.

FIG. 1 shows a mobile communication base station 10 schematically.

The base station 10 comprises multi-band antennas 12 according to the invention. In particular, the antenna 12 is designed for massive MIMO applications.

The multi-band antenna 12 is designed for emitting and receiving electromagnetic radiation in at least two different frequency bands, for example between 0.6 to 24 GHz.

In the shown embodiment for two different frequency bands, namely a first frequency band and a second frequency band are used.

For example, the first frequency band lies below the second frequency band and the frequency bands do not overlap with one another.

In the first embodiment, the first frequency band of the may have a frequency range of 6.425 to 10.68 GHz and the second frequency band may have a frequency range of 10.7 to 15.35 GHz.

The antenna 12 comprises two different types of radiators, namely first radiators 14 and the second radiators 16.

The first radiators 14 are designed to emit and receive electromagnetic radiation in the first frequency band. Likewise, the second radiators 16 are designed to emit and receive electromagnetic radiation in the second frequency band.

The first radiators 14 and the second radiators 16 are dual polarized radiators with two orthogonal polarizations, as known in the art.

For example, the dual polarized radiators are horizontally and vertically linearly polarized, +45° linearly polarized or have a clockwise and counterclockwise circular polarization. It is of course possible that the dual polarized radiators are polarized in any other two orthogonal polarizations.

It is possible, that the polarizations of the first and second radiators 14, 16 are the same, meaning that the polarizations of both of the first radiators 14 and the second radiators 16 are horizontal and vertical linearly polarizations, for example.

However, it is also conceivable that the polarizations of the first radiators 14 and the second radiators 16 are different from one another, e.g. that the first radiators 14 are horizontally and vertically polarized and the second radiators 16 are +45° polarized.

Figure 2:
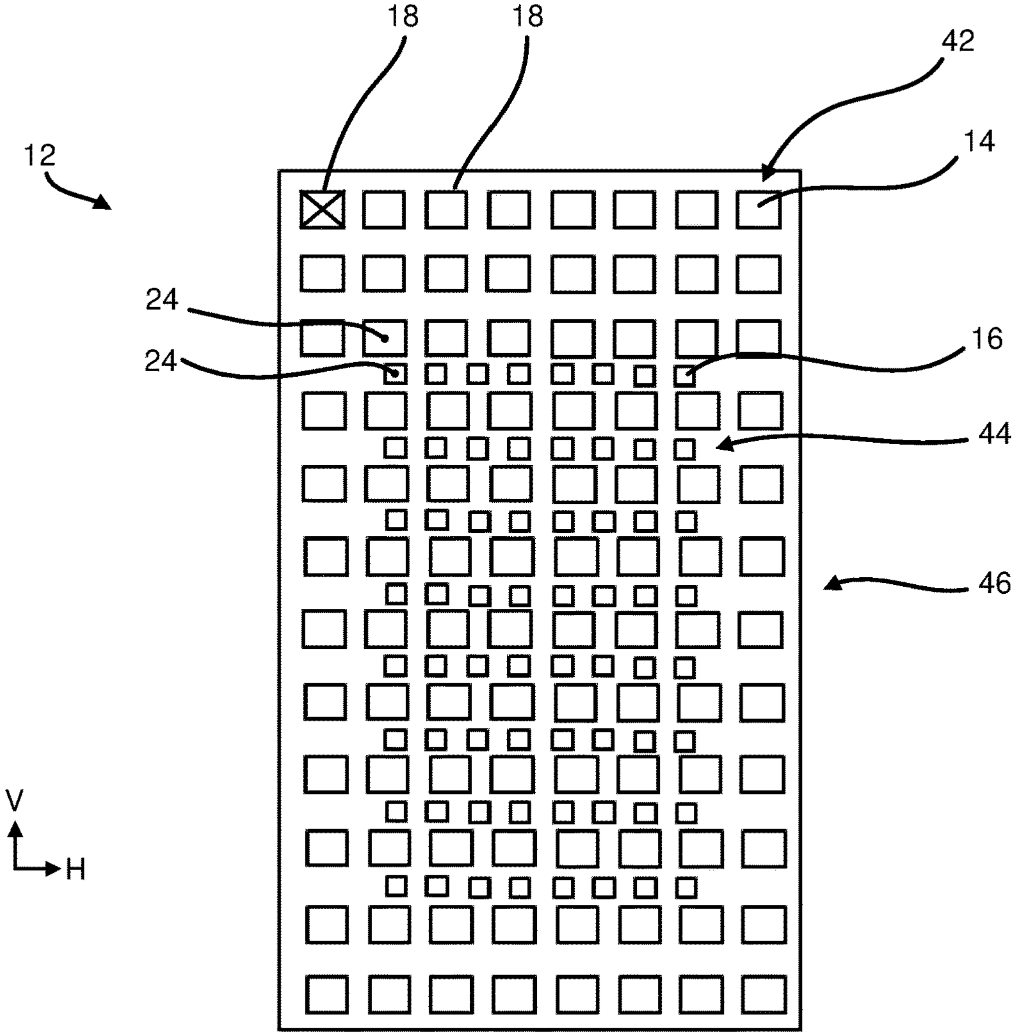
FIG. 2: shows schematically a top view of the antenna according to FIG. 1, FIG. 3: shows schematically a schematic cross-section of parts of the antenna according to FIG. 1, FIG. 4: shows schematically an enlarged view of the region of overlap of the antenna according to FIG. 1, FIG. 5: shows schematically a second embodiment of an antenna according to the invention in a top view.

FIG. 2 shows a schematic top view of the antenna 12 in which the individual radiators 14, 16 are shown as rectangles.

The vertical direction of the and the horizontal direction H in FIG. 2 corresponds to the vertical direction V and the horizontal direction H of the antenna 12 in the intended and correctly mounted position on the mobile communication base station 10.

The first radiators 14 and the second radiators 16 each have an active area 18 which is, for example, the area of the smallest rectangle that encloses the dipoles of each radiator 14, 16 in the horizontal-vertical plane, i.e. the drawing plane of FIG. 2. Thus, the active areas 18 extend into the vertical direction V and the horizontal direction H.

The active areas 18 of the first radiators 14 and the second radiators 16 do not overlap in the arrangement of the first embodiment.

In the upper left-hand first radiator 14 in FIG. 2, the two dipoles are shown to illustrate the concept of the active area 18. The rectangles shown in FIGS. 2, 4, 5, 6 and 8 correspond to the active areas 18 of their respective radiators 14, 16.

Figure 3:
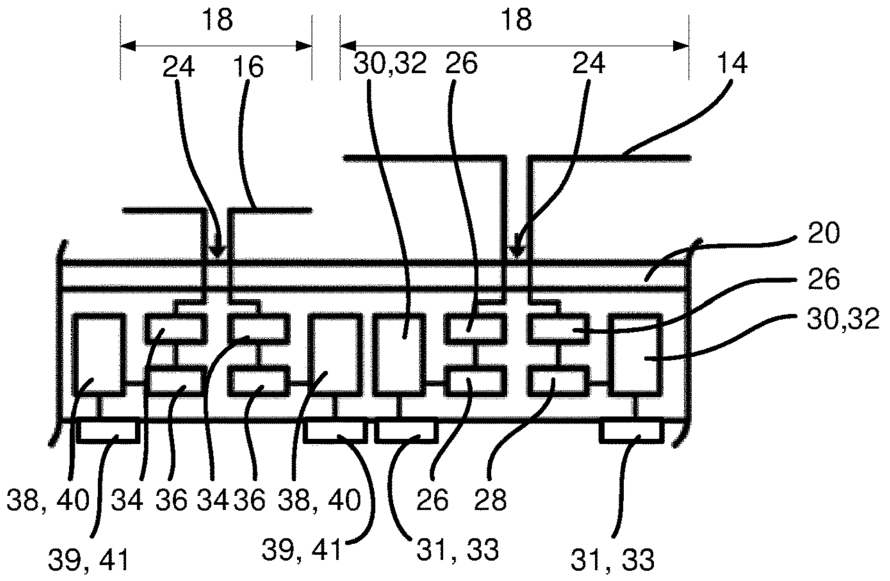

FIG. 3 shows a cross-section of a part of the antenna 12 schematically.

In FIG. 3, a first radiator 14 and a second radiator 16 are shown. The first radiator 14 and the second radiator 16 are mounted on a common circuit board 20 which comprises a fully metallized reflector plane 22 on its bottom side, i.e. the side facing away from the radiators 14, 16.

Each radiator 14, 16 comprises a support point 24 at which the radiators 14, 16 are mounted to the circuit board 20 or any other support. The support point 24 is in particular the geometric center of the active area 18. In FIG. 3, the support points 24 are indicated by arrows.

The reflector plane 22 serves as the reflector plane for the first radiators 14 as well as for the second radiators 16.

Due to the different frequencies, the first radiators 14 and the second radiators 16 have different heights above the reflector plane 22.

The antenna 12 is an active antenna, so the antenna 12 comprises electronic components for signal processing, like filters, phase shifters, splitters and combiners. The antenna 12 may also comprise a PA (power amplifier) and a LNA (low noise amplifier) for each frequency band.

As can be seen in FIG. 3, each polarization of the first radiator 14 is connected to a separate signal processing line. The signal processing line comprises a first filter 26, a first phase shifters 28 and a first splitter 30 or a first combiner 32. Further, the antenna comprises a first PA 31 and/or a first LNA 33 for the first frequency band connected to both signal processing lines. Of course, also separate first PAs 31 and/or first LNAs 33 for the different polarizations of the first frequency band may be provided as shown in FIG. 3.

Likewise, the two polarizations of the second radiators 16 are connected to separate signal processing lines each, which each comprises a second filter 34, a second phase shifter 36 and a second splitter 38 or second combiner 40. The antenna comprises a second PA 39 and/or second LNA 41 for the second frequency band connected to both signal processing lines. Of course, also separate second PAs 31 and/or second LNAs 33 for the different polarizations of the second frequency band may be provided as shown in FIG. 3.

Thus, the signal processing lines for the first radiator 14 and the second signal processing lines for the second radiators 16 are provided.

It is of course possible that each radiator 14, 16 is associated with its very own signal processing line, i.e. filter, phase shifter splitter and or combiner. It is also known to connect several radiators to the same signal processing line, of course under consideration of the polarization and the frequency band.

In the signal processing lines, the connections may be galvanic or capacitive connections and or the connection to the respective polarization of the respective radiator 14, 16 may also be galvanic or capacitively.

Turning back to FIG. 2, it can be seen that the first radiators 14 and the second radiators 16 are arranged in arrays, wherein the first radiators 14 are arranged in a first array 42 and the second radiators 16 are arranged in a second array 44. Within this disclosure, the location of each of the radiators 14, 16 is assumed to be the location of the its support point 24.

The first radiators 14 of the first array 42 are arranged in columns C1 and rows R1, namely eight columns and 12 rows in the embodiment shown in FIG. 2.

More generally, the first array 42 and/or the second array 44 may have at least four, at least eight, at least 16 or at least 32 columns C1, C2.

Neighboring first radiators 14 are spaced apart in the horizontal direction H by a first horizontal distance h1 and spaced apart in the vertical direction V by a first vertical direction v1.

Likewise, the second radiators 16 of the second array 44 are arranged in columns C2 and rows R2, namely eight columns C2 and eight rows R2.

Further, neighboring second radiators 16 are spaced apart by a second horizontal distance h2 in the horizontal direction H and by a second vertical distance v2 in the vertical direction V.

It is to be noted, that the terms "first" and "second" are used to differentiate the radiators 14, 16, arrays 42, 44, directions and the like from one another and do not imply any specific amount of radiators, arrays or direction. In particular, the use of the term “second horizontal distance” does not imply that the second array 44 comprises a first horizontal distance.

The first array 42 and the second array 44 are interleaved with one another, i.e. in a top view as shown in FIG. 2, for example, the area of the second array 44 lies fully within the area of the first array 42.

The region, in which the first array 42 and the second array 44 overlap with one another is called region of overlap 46 within this disclosure. In the example shown in FIG. 2, the region of overlap 46, as shown in an enlarged view in FIG. 4, corresponds substantially to the area of the second array 44.

The center of the first array 42 and the center of the second array 44, in particular the geometric centers of the area of the first array 42 and second array 44, respectively, are offset from one another.

Figure 4:
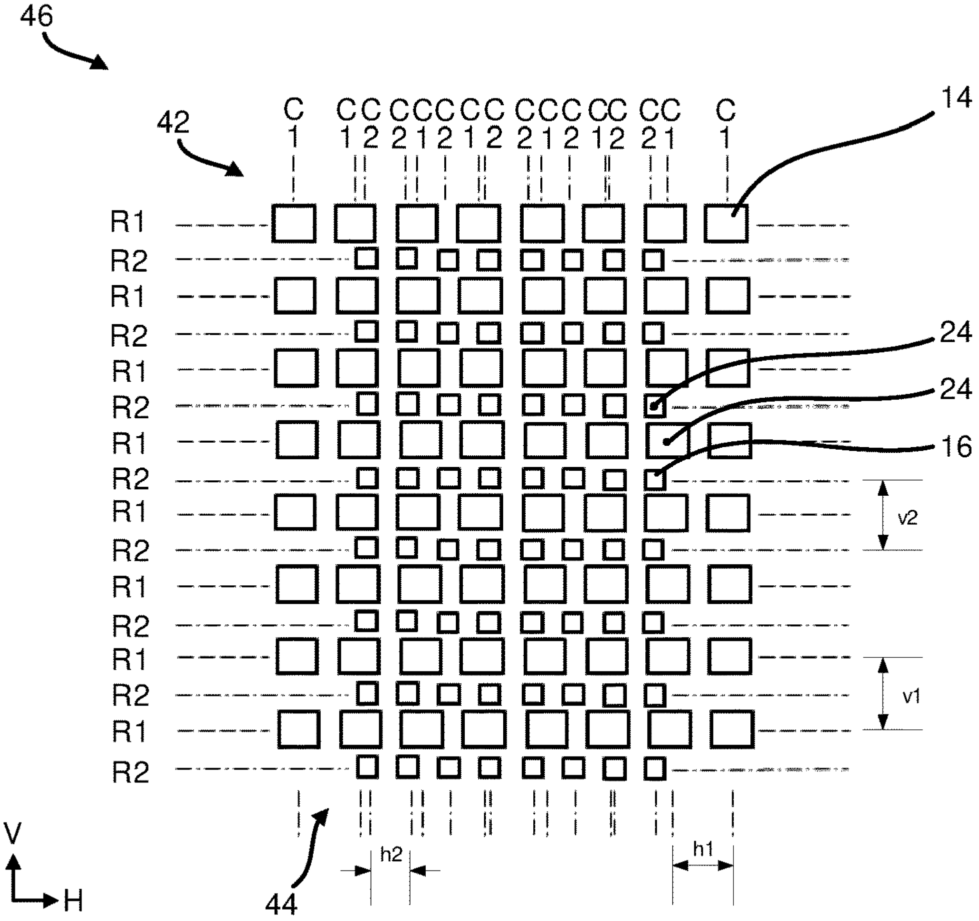

As can be seen in FIG. 4, the first vertical distance v1 and the second vertical distance v2 of the two arrays 42, 44 roughly correspond to one another. In particular, the second vertical distance v2 lies in the range of ±10% around the first vertical distance v1. In the shown embodiment, the second vertical distance v2 and the first vertical distance v1 are the same.

With respect to the wavelengths of the highest frequency in the respective frequency band, the values of the first vertical distance v1 and of the second vertical distance v2 differ of course, due to the difference in the wavelengths of the highest frequency of the respective band.

The first vertical distance v1 lies in the range of 0.2 to 0.7, in particular in the range of 0.3 to 0.6 times the wavelengths of the highest frequency in the first frequency band. The second vertical distance v2 lies in the range of 0.5 to 1.1, in particular in the range of 0.6 to 1.0 times the wavelength of the highest frequency in the second frequency band.

In the horizontal direction H, the first horizontal distance h1 and the second horizontal distance h2 different from one another in absolute length and are chosen with respect to the wavelengths of the highest frequency of their respective frequency band.

For example, the first horizontal distance h1 lies in the range of 0.4 to 0.6, in particular is equal to 0.5 of the wavelength of the highest frequency in the first frequency band.

The second horizontal distance h2 lies, for example, in the range of 0.4 to 0.6, in particular is equal to 0.5 of the wavelength of the highest frequency in the second frequency band.

This choice of first and second vertical and horizontal distances h1, h2, v1, v2 allows to arrange the rows R1, R2 of the arrays 42, 44 and thus the first radiators 14 and the second radiators 16 alternatingly in the vertical direction V.

As can be seen in FIG. 4, within the region of overlap 46, and following the vertical direction V, the rows R1 of the first array 42 and the rows R2 of the second array 44 are arranged alternatingly.

In particular, following a line in the vertical direction V which intersects the active areas 18 of first radiators 14 and second radiators 16, the first radiators 14 and the second radiators 16 are arranged alternatingly.

It is of course possible, that vertical lines exist in which first radiators 14 are present but no second radiators 16 and vice versa.

Thus, by departing from fixed vertical distance of 0.9 times the wavelength between rows of the first array 42, which is almost exclusively used in the prior art, it is possible to achieve a very efficient and easy to manufacture multi-band antenna 12.

In order to make up for the loss in area of the first array 42 compared to the prior art vertical distance of 0.9 wavelength, the number of rows R1 of the first array 42 is increased compared to designs with the same number of rows R1 and columns C1 in the first array.

In the shown embodiment, the four rows R1 are added to a symmetric design of eight rows R1 and eight columns C1 to the effect that the length of the first array 42 in the vertical direction V corresponds to at least the length of an array of the same frequency band with half of the number of rows but a vertical distance between neighboring radiators between 0.8 and 1.0 times, in particular 0.9 times the wavelength of the highest frequency of the first frequency band.

Thus, an active multi-band antenna 12 for massive MIMO applications can be manufactured easily so that dedicated power amplifiers and filters for each band can be used that are specifically designed for one of the frequency bands. Further, the frequency bands can be isolated from one another and the voltage standing wave ratio (VSWR) can also be improved.

FIGS. 5 to 8 show further embodiments of the antenna 12 which corresponds substantially to the embodiment explained in FIGS. 2 to 4. Thus, in the following only the differences are described and same and functionally the same components are labeled with the same reference signs.

Figure 5:
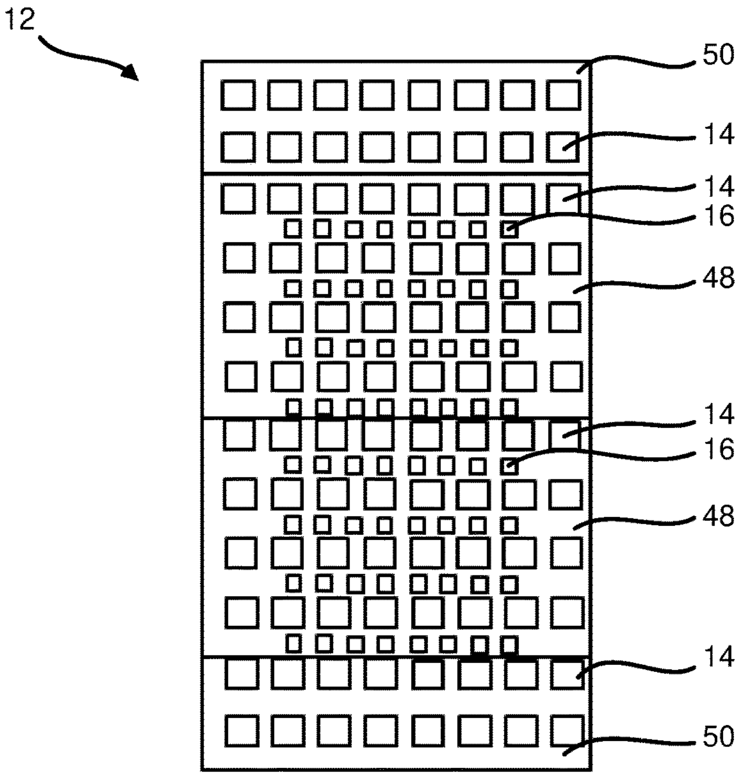

FIG. 5 shows a top view of a multi-band antenna 12 according to a second embodiment of the invention. The view corresponds to the view of FIG. 2.

In this second embodiment, the antenna 12 is made up of several modules, namely two multi-band modules 48 and two single band modules 50.

The multi-band modules 48 comprise, as can be seen in FIG. 5, parts of the region of overlap 46.

In the shown second embodiment, one multi-band module 48 comprises four rows R1 and eight columns C1 of the first array 42 as well as for rows R2 and eight columns C2 of the second array 44. The single band modules 50 comprise only first radiators 14 of the first array 42, namely two rows R1 and eight columns C1.

The multi-band modules 48 are identical to one another as well as the single band modules 50 are identical to one another.

In the vertical direction V, the two multi-band modules 48 are adjacent to each other and abut each other, and the single band modules 50 are arranged above and below the multi-band modules 48, abutting the respective multi-band module 48.

The first radiators 14 and second radiators 16 of the multi-band modules 48 and the first radiators 14 of the single band modules 50 altogether form the first array 42 and the second array 44, respectively, having the horizontal distances h1, h2 and vertical distances v1, v2, as explained with respect to the first embodiment.

The multi-band modules 48 and the single band modules 50 also comprise the respective electronic components for signal processing of the signals to and from the radiators 14, 16 on the specific module 48, 50.

For example, the modules 48, 50 comprise filters 26, 34, phase shifters 28, 36, splitters 30, 38 and/or combiners 32, 40.

Of course, other designs of the modules 48, 50 are conceivable that, when arranged adjacent to one another, form the first and second array 42, 44.

Using the modularity, it is possible to easily and cost efficiently provide antennas 12 of various lengths in the vertical direction V. For example, in the shown embodiment, if a much longer antenna 12 in the vertical direction V is desired, additional multi-band modules 48 and optionally single band modules 50 can be added to the design shown in FIG. 5.

Figure 6:
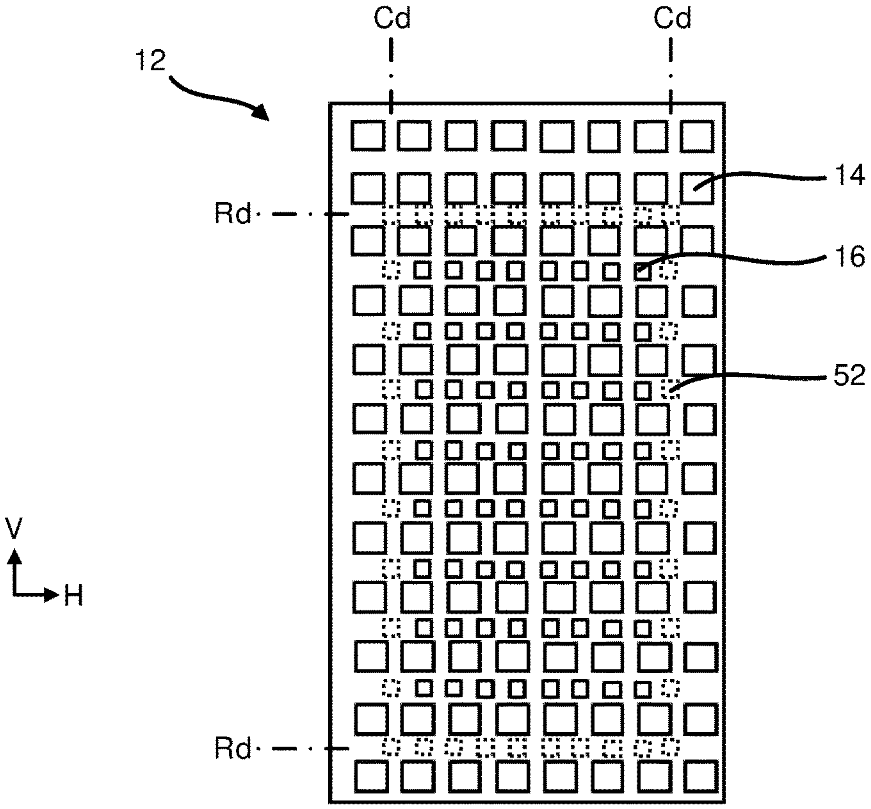
FIG. 6: shows schematically a third embodiment of an antenna according to the invention in a top view.

FIG. 6 shows a top view corresponding to the top view of FIG. 2 of a third embodiment of an antenna 12.

In this embodiment, besides first radiators 14 and second radiators 16, the antenna 12 comprises a plurality of dummy radiators 52.

The dummy radiators 52 correspond to the second radiators 16 or are even identical to the second radiators 16, wherein the ports of the dummy radiators are short-circuited or terminated with a resistance, for example 50 Ohms. Thus, the dummy radiators 52 are not connected to any signal line or signal processing unit.

The dummy radiators 52 are arranged in two columns Cd and two rows Rd.

One of the rows Rd is arranged above the first row R2 of the second array 44 in the vertical direction V and the other one below the lowest row R2 of the second array 44. The columns Cd are arranged in the horizontal direction H to the left and to the right, respectively, of the outermost columns C2 of the second array 44.

Thus, the rows Rd and the columns Cd of the dummy radiators 52 form a rectangle around the second array 44.

The distance between the dummy radiators 52 and adjacent second radiators 16 is equal or smaller than the corresponding second vertical distance v2 and the second horizontal distance h2.

With the use of dummy radiators 52, the radiation pattern of the antenna 12 in the second frequency band is improved.

Figure 7:
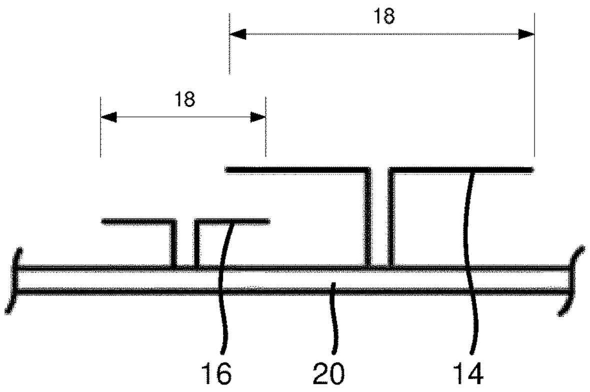
FIG. 7: shows schematically a cross-section of parts of an antenna according to a fourth embodiment of the invention.

FIG. 7 shows a cross-section of parts of the multi-band antenna 12 according to a fourth embodiment of the invention. In the cross-section, a first radiator 14 and a second radiator 16 are shown. The distance between the first radiator 14 and the second radiator 16 are such that parts of the radiators 14, 16 overlap in a projection onto the horizontal-vertical plane of the antenna 12 (e.g. drawing plane of FIG. 2). Thus, the active areas 18 of the first radiators 14 and the second radiators 16 partly overlap.

In other words, the second radiators 16 lie partly below the first radiators 14.

To this end, the first radiators 14 are transparent for electromagnetic radiation in the second frequency band.

With partly overlapping radiators 14, 16, the overall size of the antenna 12 may be reduced.

Figure 8:
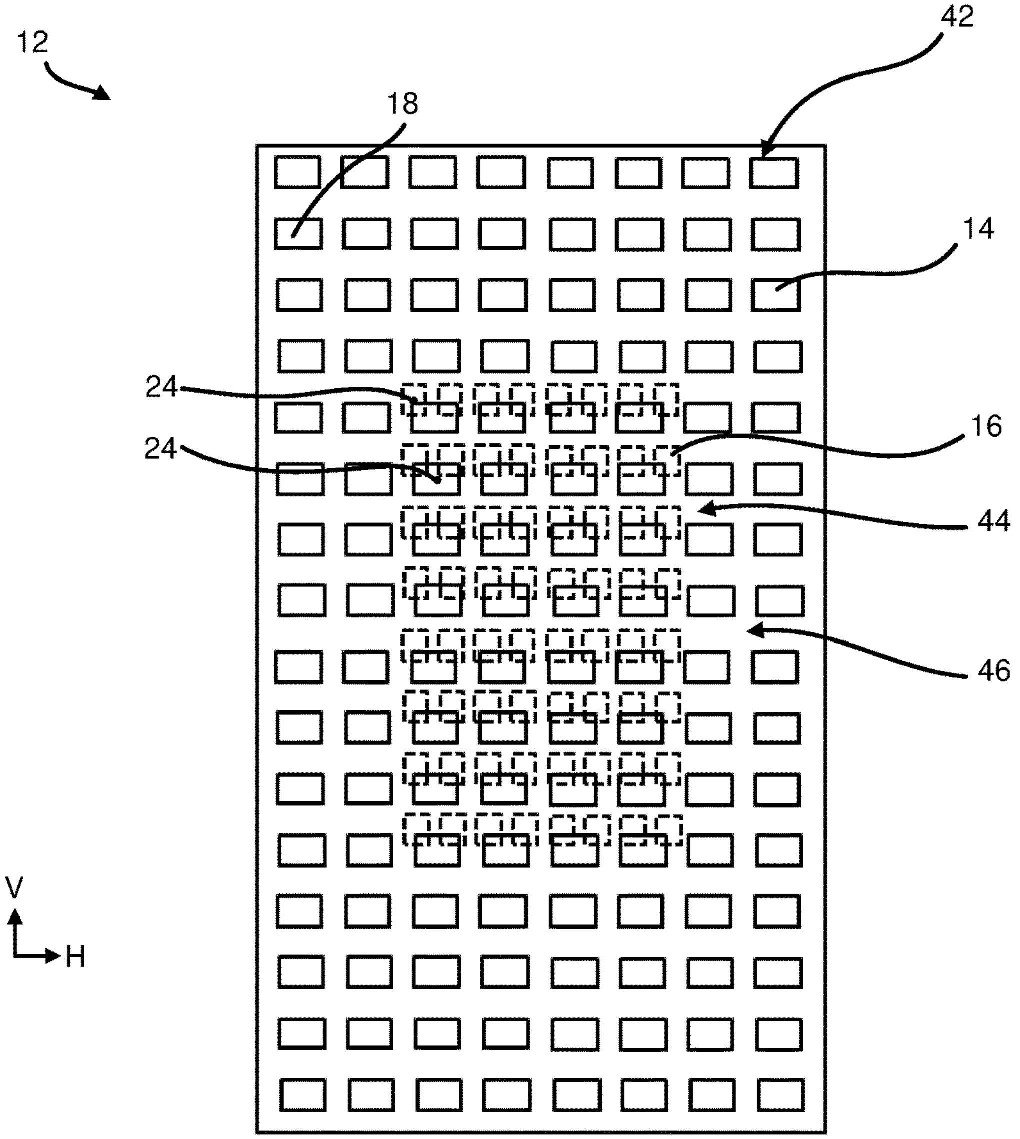
FIG. 8: shows schematically a top view of a fifth embodiment of the invention.

FIG. 8 shows a view corresponding to the view of FIG. 2 but of a fifth embodiment of the antenna 12.

In this fifth embodiment, radiators 14 and 16 may overlap as explained with respect to the fourth embodiment.

Further, the first array 42 comprises eight columns C1 and 16 rows R1. Thus, the number of rows R1 is double the number of columns C1.

Further, the second array 44 comprises eight rows R2 and eight columns C to so that the number of rows R1 of the first array 42 is double the number of rows R2 of the second array 44.

In the fifth embodiment, the first frequency band has a frequency range of 1.4 to 3 GHz and the second frequency band has a frequency range of 3.1 to 6 GHz.

Other combinations of frequency ranges are also conceivable, for example that the first frequency band has a frequency range of 3 to 5 GHz and the second frequency band has a frequency range of 5.9 to 10.7 GHZ; or that the first frequency band has a frequency range of 600 to 960 MHz and the second frequency band has a frequency range of 1400 to 2700 MHZ.

Further, the features of the individual embodiments described above may be of course be combined freely.

In particular, overlapping radiators 14, 16 of the fourth embodiment shown in FIG. 7 as well as the modules 48, 50 of the second embodiment and/or the dummy radiators 52 of the third embodiment can be equally applied to any of the other embodiments shown.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A multi-band antenna for a mobile communication base station, the multi-band antenna comprising a first array of first radiators for a first frequency band and a second array of second radiators for a second frequency band, wherein the first frequency band and the second frequency band do not overlap, wherein the first array comprises at least four rows (R1) and at least four columns (C1) of the first radiators, and wherein the second array comprises at least four rows (R2) and at least four columns (C2) of the second radiators, characterized in that the first array and the second array are interleaved such that in the region of overlap of the first array and the second array the rows (R1) of the first array and the rows (R2) of the second array are arranged alternatingly in a vertical direction (V) of the antenna, wherein:

the first radiators and/or the second radiators are dual polarized radiators with two orthogonal polarizations, wherein the two orthogonal polarizations are a horizontal linear polarization and a vertical linear polarization; a +45° linear polarization and a −45° linear polarization; a clockwise circular polarization and a counterclockwise circular polarization; or any other two orthogonal polarizations.

2. The multi-band antenna according to claim 1, characterized in that along a vertical line in the region of overlap the first radiators and the second radiators are arranged alternatingly, and/or that the center of the first array is offset from the center of the second array.

3. The multi-band antenna according to claim 1, characterized in that, in the vertical direction (V), the first radiators are spaced apart by a first vertical distance (v1) and the second radiators are spaced apart by a second vertical distance (v2), wherein the second vertical distance (v2) lies in a range of −10% to +10% around the first vertical distance (v1).

4. The multi-band antenna according to claim 1, characterized in that the first vertical distance (v1) lies in a range of 0.2 to 0.7 of the wavelength of the highest frequency in the first frequency band and that the second vertical distance (v2) lies in a range of 0.5 to 1.1 of the wavelength of the highest frequency in the second frequency band.

5. The multi-band antenna according to claim 1, characterized in that in a horizontal direction (H), the first radiators are spaced apart by a first horizontal distance (h1) and the second radiators are spaced apart by a second horizontal distance (h2), wherein the first horizontal distance (h1) lies in a range of 0.4 to 0.6 of the wavelength of the highest frequency in the first frequency band, and/or that the second horizontal distance (h2) lies in a range of 0.4 to 0.6 of the wavelength of the highest frequency in the second frequency band.

6. The multi-band antenna according to claim 1, characterized in that the first array and/or the second array comprises at least 4, 8, 16 or 32 columns (C1, C2) and/or at least 4, 8, 16 or 32 rows (R1, R2) of radiators.

7. The multi-band antenna according to claim 1, characterized in that the polarizations of the first radiators are the same or different from the polarizations of the second radiators.

8. The multi-band antenna according to claim 1, characterized in that the antenna is an active antenna.

9. The multi-band antenna according to claim 8, characterized in that the antenna comprises a first filter, a first phase shifter, a first splitter and/or a first combiner connected to one or more of the first radiators and a second filter, a second phase shifter, a second splitter and/or a second combiner connected to one or more of the second radiators.

10. The multi-band antenna according to claim 1, characterized in that the antenna comprises a plurality of modules, wherein each module comprises first radiators of parts of the first array and/or second radiators of parts of the second array, wherein the modules are arranged adjacent to each other such that the first radiators and/or the second radiators of the modules together form the full first array and/or the full second array, respectively.

11. The multi-band antenna according to claim 10, characterized in that each module comprises a filter, a phase shifter, a splitter and/or a combiner for the signals received and/or emitted from the first radiators and/or second radiators of the respective module.

12. The multi-band antenna according to claim 1, characterized in that the first frequency band and the second frequency band are frequency bands in the range of 0.6 to 24 GHz.

13. The multi-band antenna according to claim 1, characterized in that the first radiators and the second radiators have an active area in the vertical direction (V) and horizontal direction (H) each, wherein the active areas of first radiators overlap or do not overlap with the active areas of second radiators.

14. The multi-band antenna according to claim 1, characterized in that the number of rows (R1) of the first radiators of the first array is double of the number of rows (R2) of the second radiators of the second array, that the number of rows (R1) of the first array is double the number of columns (C1) of the first array and/or that the first array has a length in the vertical direction (V) corresponding to at least the length of an array of the same frequency band with half the number of rows but a vertical distance between neighboring radiators between 0.8 and 1.0 of the wavelength of the highest frequency of the frequency band.

15. The multi-band antenna according to claim 1, characterized in that the second array comprises dummy radiators surrounding the outer rows (R2) and columns (C2) of second radiators.

16. The multi-band antenna according to claim 15, characterized in that the dummy radiators are arranged in two rows (Rd) and two columns (Cd) forming a rectangle around the area of second radiators.

17. The multi-band antenna of claim 1 wherein, the first radiators are spaced apart a first vertical distance (v1) and the second radiators are spaced apart a second vertical distance (v2);

the first vertical distance (v1) lies in a range of 0.2 to 0.7 of a wavelength of a highest frequency in the first frequency band; and the second vertical distance (v2) lies in a range of 0.5 to 1.1 of the wavelength of a highest frequency in the second frequency band.

18. A mobile communication base station comprising an antenna comprising:

a first array of first radiators for a first frequency band and a second array of second radiators for a second frequency band, wherein the first frequency band and the second frequency band do not overlap, wherein the first array comprises at least four rows (R1) and at least four columns (C1) of the first radiators, and wherein the second array comprises at least four rows (R2) and at least four columns (C2) of the second radiators, characterized in that the first array and the second array are interleaved such that in the region of overlap of the first array and the second array the rows (R1) of the first array and the rows (R2) of the second array are arranged alternatingly in a vertical direction (V) of the antenna, wherein:

the first radiators and/or the second radiators are dual polarized radiators with two orthogonal polarizations, wherein the two orthogonal polarizations are a horizontal linear polarization and a vertical linear polarization; a +45° linear polarization and a −45° linear polarization; a clockwise circular polarization and a counterclockwise circular polarization; or any other two orthogonal polarizations.

19. The mobile communication base station of claim 18 wherein, the first radiators are spaced apart a first vertical distance (v1) and the second radiators are spaced apart a second vertical distance (v2);

the first vertical distance (v1) lies in a range of 0.2 to 0.7 of a wavelength of a highest frequency in the first frequency band; and the second vertical distance (v2) lies in a range of 0.5 to 1.1 of the wavelength of a highest frequency in the second frequency band.

* * * * *